United States Patent [19]
Yum et al.

[11] 3,831,600
[45] Aug. 27, 1974

[54] FLUID FLOW CONTROL
[75] Inventors: Su Il Yum, Mountain View; Richard G. Buckles, Menlo Park, both of Calif.; Richard M. Barrer, London, England
[73] Assignee: ALZA Corporation, Palo Alto, Calif.
[22] Filed: Apr. 2, 1973
[21] Appl. No.: 346,749

[52] U.S. Cl.................. 128/214 R, 138/46, 251/4, 251/8
[51] Int. Cl.......................... A61n 05/14, F16k 7/06
[58] Field of Search............................. 138/43–46; 222/214; 251/4–8; 128/214 R, 214.2

[56] References Cited
UNITED STATES PATENTS
| | | | |
|---|---|---|---|
| 340,696 | 4/1886 | Caldwell | 138/46 |
| 1,905,335 | 4/1933 | Bijur | 138/46 |
| 2,954,028 | 9/1960 | Smith | 251/8 |
| 3,512,748 | 5/1970 | Wilson | 251/8 |
| 3,642,031 | 2/1972 | Wright | 138/45 |
| 3,717,176 | 2/1973 | Smith | 251/5 |

Primary Examiner—William R. Cline
Assistant Examiner—George L. Walton
Attorney, Agent, or Firm—Thomas E. Ciotti; Edward L. Mandell; Paul L. Sabatine

[57] ABSTRACT

An improved variable fluid flow control is disclosed. This control employs a fluid-containing deformable elastic conduit having a plurality of parallel elastomeric fibers positioned axially within. Fluid passes through the conduit along the fibers. The rate of fluid flow is altered by applying a greater or lesser deforming compression, perpendicular to the direction of fluid flow, to the conduit at the location of the parallel aligned elastomeric fibers.

9 Claims, 2 Drawing Figures

FLUID FLOW CONTROL

BACKGROUND OF THE INVENTION

1. Field of the Invention

This invention relates to a device for accurately and reproducibly regulating small fluid flows.

2. The Prior Art

It has long been recognized that the flow of a fluid may be moderated by placing a porous mass in the flow path and applying a variable compression to the porous mass. Representative applications of this principle include Caldwell, in U.S. Pat. No. 340,696, dated Apr. 27, 1886, which discloses a gas valve employing sponge or an equivalent as the compressible porous mass; Bijur, U.S. Pat. No. 1,905,335, dated Apr. 25, 1933, which teaches the regulation of a flow of oil by a tightly packed fibrous or porous material such as felt; and Wilson, U.S. Pat. No. 3,512,748, which controls flow of liquids by compressing a restricting latex foam interposed in a flow passage.

These controls of the past do permit controlled fluid flows to be achieved, but have a number of serious failings; while they are responsive to an increase in compression and show a corresponding decrease in flow, they often, through matting or stretching of the porous mass, fail to respond to a small decrease in compression with a corresponding flow increase. Also, at very low flow rates in the range of 0.1 to 10 cc's per hour, they do not give reproducible flow rates, either from one device to another or from one flow setting to another. These failings make such flow controls unsuitable for application where variable amounts of fluid are being passed, the amounts passed must be known with exactness and calibration after each flow adjustment is either impossible or inconvenient.

STATEMENT OF THE INVENTION

It is an object of the present invention to provide means for reproducibly controlling very small flows of liquids.

It is a more particular object of this invention to provide a liquid flow control employing a variably compressed porous mass as means for adjusting flow which may be reproducibly fabricated and which reproducibly controls the flow of fluids, especially at very low flow rates. The flow control of this invention employs a deformable resilient tube through which the fluid flows which has a plurality of parallel linear elastic elongate fibers inside. These fibers are aligned axially in the tube and substantially fill the tube. The tube, at the point at which the fibers are positioned, is restricted to varying degrees by a clamp or similar compressing means. A critical and new feature of the present flow control which enables the desired achievement of reproducible control fabrication and reproducibly controlled flows is the use of a plurality of aligned linear elastomeric fibers which substantially fill the passage through which the fluid flows.

BRIEF DESCRIPTION OF THE DRAWINGS

The invention will be described in more detail hereinafter with reference being made to the accompanying drawings wherein.

DETAILED DESCRIPTION OF THE INVENTION

Figure 1:
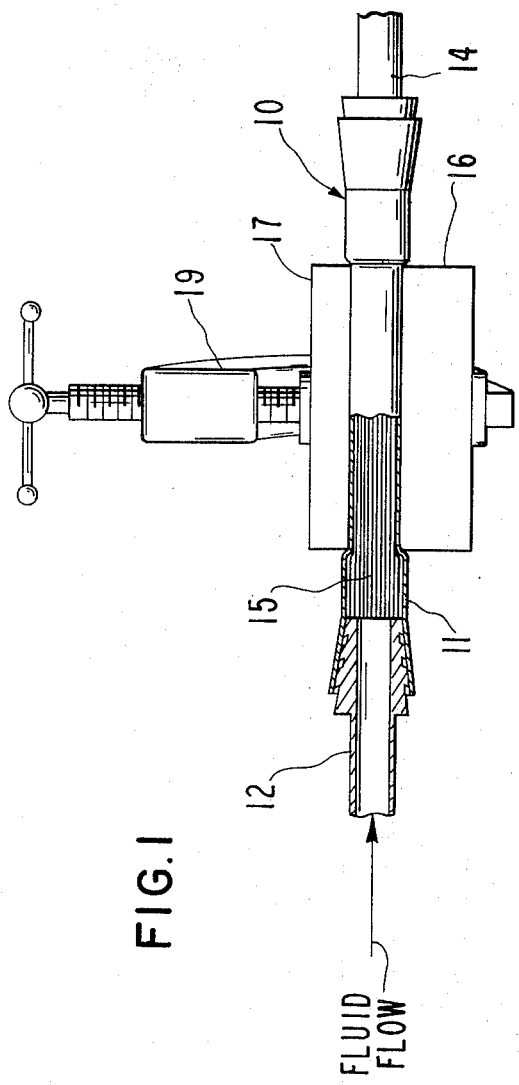
FIG. 1 is an elevational view, partially in cut-away section, of a flow control of this invention.

Referring now to FIG. 1, a flow control 10 is there illustrated. Flow control 10 comprises hollow conduit 11 made of a deformable resilient elastic material. Conduit 10 has a rounded cross section such as circular, elliptical or the like. A circular cross section is preferred. Attached to opposing ends of conduit 11 are connectors 12 and 14. The fluid flow to be controlled enters conduit 11 through connector 12. The controlled flow passes out through connector 14. Located within conduit 11 between connectors 12 and 14 are a plurality of fibers 15. These fibers, as shown, substantially fill conduit 11 and are parallel one to another and are in axial alignment within conduit 11. Fibers 15 are essentially linear and are made of a resilient elastomeric material, such as, for example, the poly(urethane) sold under the name "Lycra-Spandex." Conduit 11 rests in a U-shaped base 16, a compressive force being applied to conduit 11 by means of block 17 and adjustable clamp 19. This compressive force is applied to conduit 11 in a direction which is perpendicular to the flow of fluid through conduit 10. The compressive force is applied to conduit 11 at the point where axially aligned fibers 15 are located and may be applied over all or part of the length of the aligned fibers.

As compressive force is applied to conduit 11, the conduit deforms. The circumference of conduit 11 does not change appreciably. This deformation brings about a decrease in the conduit's internal cross-sectional area. Since the cross section of the aligned fibers within the conduit does not change appreciably, they thus fill an increasing proportion of the conduit's cross section so that the space for fluid to flow and hence the rate of flow of fluid through the conduit decreases. In elementary control 10, varying the degree of clamping of clamp 19 varies the compression of conduit 11 and fibers 15 and thus the rate of liquid flow through control 10.

The internally aligned fibers are closely packed within the outer conduit. Generally, the fibers should take up (i.e., have a packing density of) at least 50 percent of the internal cross-sectional area of the conduit prior to compression. Preferably, the fibers take up at least 60 percent of the cross-sectional area. In a most preferred embodiment, the fibers are themselves of rounded (preferably circular) cross-section and are present in a close-packed configuration, thus taking up about 85–87 percent of the conduit's cross-sectional area.

The number of internal fibers and their size relative to the diameter of the outer conduit's inside diameter may vary. As a general rule there must be at least about six internal fibers. The upper limit on the number of fibers is not critical. As many as several hundred fibers may be used. The size of the inner fibers is dependent upon the number of fibers and the packing density within the ranges already set forth. Preferably the fibers are of circular cross section, but elliptical cross sections are acceptable. Preferred diameters for such fibers are from about 0.4 to about 0.04 times the inside diameter of the outer conduit.

As the flow control of this invention finds favored application in the regulation of small fluid flows, the overall dimensions of the controls are generally relatively small. In one preferred embodiment, the inside diameter of the conduit is between about 0.3 mm and about 6 mm and the fibers are from about 1 cm to about 12 cm long. Depending on the magnitude of the flow to be regulated and the pressure drop across the device, these dimensions may suitably be enlarged or decreased as desired.

In situations in which maximum control reproducibility is desired, it is useful to construct the devices so that upon compression and relaxation there is a minimum of movement of the aligned fibers one to another. One way to accomplish this is to employ an outer conduit which compresses somewhat (say up to about 10 percent) the aligned fibers. This compression increases the contact area and friction between fibers and limits their movement against one another.

Another way to accomplish this is to restrict the lateral spread of the tube or conduit when under compression, that is, to bound the conduit at the point of compression on either side by parallel walls or other means which restrict and prevent the lateral spreading of the conduit when compression is applied.

Figure 2:
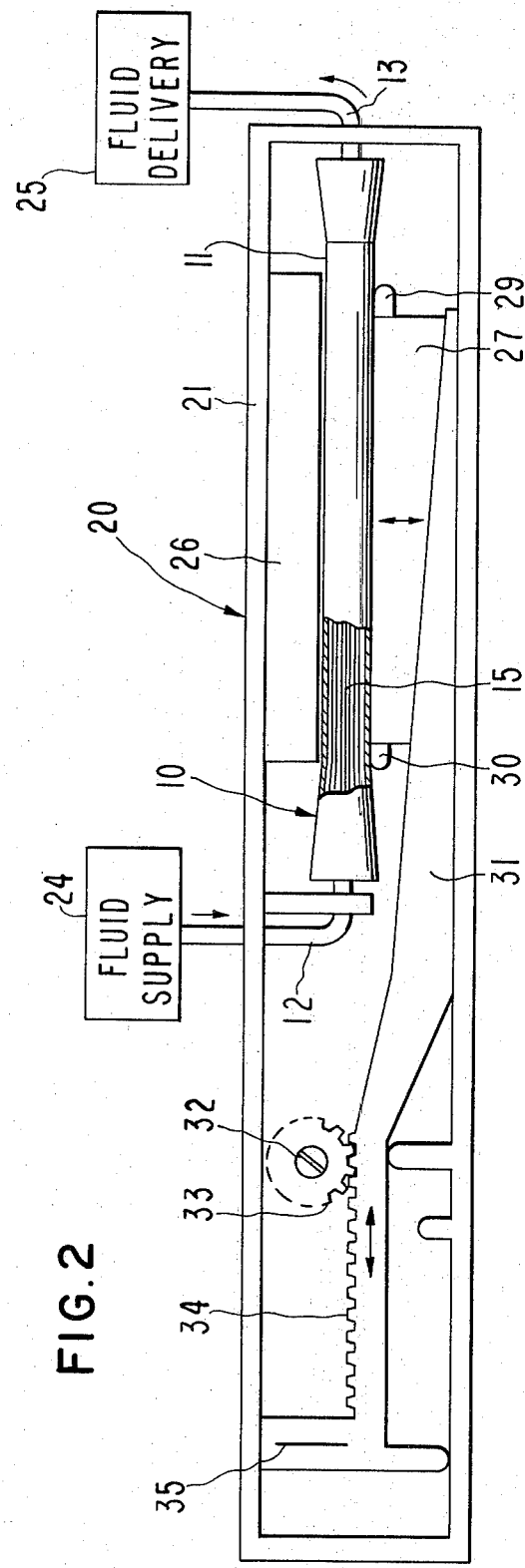
FIG. 2 is a partially elevational - partially schematic - partially cut-away view of a flow control of this invention.

In FIG. 2 a fluid delivery system is shown which employs another representative means for compressing the flow control of the present invention. This fluid delivery system 20 comprises a flow control element 10 much as described with reference to FIG. 1, that is, flow control 10 contains a cylindrical conduit 11 having a plurality of parallel aligned fibers axially placed therein. The fibers are monofilamentary. Flow control 10 is attached to base 21 by means of hollow tube connectors 12 and 13. Fluid is supplied from fluid supply 24 to flow control 10 through connector 12 and passes from control 10 through connector 13 to fluid delivery means 25. Fluid supply 24 may take on a variety of forms. It may be a gravity-feeding fluid reservoir. Preferably it supplies fluid under pressure to control 10 such as by means of hydraulic or pneumatic pressure supplied by pumps or by other equivalent means. Delivery means 25 may take on a variety of configurations as well, depending upon the liquid delivered by system 20 and the use for which the delivered liquid is to be put. In a preferred embodiment of this invention system 20 and fluid delivery 25 are adapted to administered drugs and/or medical fluids to patients such as by intravessel (i.e., intravenous or intra-arterial) infusion. In such an embodiment, fluid delivery 25 would take the form of an I.V. catheter, needles or the like.

Control of fluid flow in system 20 is achieved as follows: flow control 20 is bounded on one side by block 26, attached to base 21. Opposing block 26 is vertically movable wedge 27, which is prevented from moving horizontally by locating pegs 29 and 30 which are also attached to base 21. The vertical position of wedge 27 is controlled by the horizontal position of laterally movable wedge 31, the position of which in turn is controlled by the rotational position of slotted key 32 and pinion 33. As pinion 33 is rotated it drives rack 34 and wedge 31 in a horizontal direction. Indicator 35 on wedge 31 moves relative to a set scale (not shown) fixed to base 21. As wedge 31 is moved from side to side, it compresses, more or less, the deformable tube 11 and the internal aligned fibers 15 therewithin. As the compression of tube 11 varies, it likewise causes the rate of fluid flow through control 10 to vary—inversely with the degree of compression.

The conduit and the internal fibers may be formed of the same material or of different materials. In the latter event, the materials share the same properties. Suitable materials for forming the cylindrical tube and/or the internal fibers are resilient, deformable materials which are inert to the fluid, the flow of which is being regulated. Suitable materials include natural rubber (preferably suitably leached or treated to extract impurities which potentially would contaminate the fluid), as well as synthetic elastomers, for example, poly(isoprene), poly(1-4 butadiene) segmented polyurethane of the polyether variety (i.e., "Lycra Spandex"), block co- and ter-polymers containing butadiene and styrene (the Kratons), silicone rubbers such as the Silastics, butyl rubber, nitril/butadiene rubber and neoprene.

Without intent to limit the scope of this invention, and while other elastomeric materials as exemplified immediately hereinabove may be used, the segmented poly(urathanes) ("Lycra Spandex"), butyl rubber and Silicone rubbers are preferred materials from which to fabricate the elastomeric fibers and silicone rubbers, polyisoprene and butyl rubbers are preferred materials from which to fabricate the outer conduit.

The present invention will be further illustrated by the following Examples and Comparative Illustrations. These are not intended to limit the scope of this invention.

EXAMPLE 1

A fluid flow control in accordance with this invention is prepared. First a supply of commercial Lycra Spandex (polyurethane) 70 denier monofilament is obtained. This material is of circular cross-section and is about 0.10 mm in diameter. A bundle of 400 of these monofilaments all in parallel alignment is prepared and placed inside a 1.59 mm I.D. outer tube. The placement of the fibers is accomplished by temporarily stretching the Silastic outer tube on a mandrel. Six 5 cm sections are cut from the tube. The inner fibers fill about 87 percent of the outer tubes interior cross section. Rubber connectors, fabricated from 3.18 mm I.D. rubber tubing are cemented to each end of the 5 cm sections. One of the tubes is attached to a water system which supplies water at 0.7 kg/cm$^2$ pressure and the flow of water through the tube is observed to be 16.5 cc/hour. The other 5 tubes are serially substituted and observed to differ from the first tube in flow by not more than ±5 percent. The first tube is reinstalled in the test apparatus. The tube is placed between the jaws of a flat-faced micrometer clamp. The jaws of the clamp compress the tube over a distance of about 5 cm in the area where the monofilaments are lodged. The clamp is increasingly tightened to measured degrees and the fluid flow rates through the tube for each degree of clamping are measured and found to decrease to 0 mls per hour. The clamp is then released, gradually returning to the original degree of clamping. The flows observed when releasing the clamp are within ±5 percent of the flows observed earlier at corresponding degrees of tightening.

The remaining 5 tubes are again installed one at a time in the test apparatus. Each is clamped to the same degree and the rate of fluid flow is measured. It is found that the flows are substantially reproducible, ±5 percent, one tube to the next.

EXAMPLE II

A fluid flow control substantially in accord with the controls of Example I is prepared. The same outer tube and fabrication method are employed. As inner fibers, 80 0.25 mm diameter circular cross-section silicone rubber monofilaments are employed. They fill up 85 percent of the tube's interior cross section. The tube is cut into 6 cm sections and tested in the manner outlined in Example I. Although the flow rates at given degrees of clamping are different with these controls than with the controls of Example I, these controls give flows which are reproducible both from one tube to another and from tightening to slackening of clamping.

One of these tubes is installed in a drug delivery device schematically as depicted in FIG. 2. A solution of drug (0.5 percent heparin in saline) is supplied under pressure 0.7 kg/cm$^2$ to the control tube by means of a drug supply. The control tube is compressed to varying degrees by a sliding ramp clamp as shown in FIG. 2. The flow of drug varies between 10 mls per hour and 1.0 mls per hour as a function of the degree of clamping. This controlled small flow of drug solution is passed to drug delivery means, in this case a polyethylene tube leading to a 50 mm 25 gauge intravenous infusion needle and administered to a patient.

COMPARATIVE ILLUSTRATION A

The controls of Example II are prepared with one change. Instead of using axially aligned parallel rubber fibers, the same total length of rubber fiber is packed into the outer tube in a random "wool-like" packing. The resulting controls, while giving relatively similar flows upon application and relaxation of compression, gave virtually no flow reproducibility—one control to the next.

COMPARATIVE ILLUSTRATION B

The controls of Example II are prepared with one change—instead of rubber monofilaments, non-elastic Nylon filaments are employed as inner fibers. The resulting controls when tested do not give the same fluid flows upon relaxation of compression that they do upon application of compression.

COMPARATIVE ILLUSTRATION C

The controls of Example II are prepared with one change. Only 40 rubber fibers are employed. Thus, only 43 percent of the tube's inner cross-section is filled with fiber. Upon testing, reproducible flows, one control to the next, are not obtained.

We claim:

1. Fluid flow control comprising in combination:
   a. a tube of a deformable elastic material defining an internal fluid flow passageway;
   b. a plurality of parallel linear elongate elastic fibers lodged in axial alignment within the internal fluid flow passageway filling at least 50 percent of the cross-section of the passageway; and
   c. compressing means disposed about the tube at the location adjacent to the plurality of fibers deforming, to variable degrees, the tube.

2. The fluid flow control of claim 1 wherein the fibers fill from about 50 percent to about 85 percent of the cross section of the fluid flow passageway.

3. The fluid flow control of claim 2 wherein the compressing means comprises a clamp.

4. The fluid flow control of claim 2 wherein the tube is of circular cross-section.

5. The fluid flow control of claim 1 wherein the fibers are monofilaments of circular cross-section.

6. The fluid flow control of claim 1 wherein the fibers fill from 50 to about 95 percent of the cross-section of the passageway.

7. A device for the continuous delivery of a controlled reproducible flow of a liquid drug to a patient comprising in combination: liquid supply means for supplying the liquid drug under pressure; a liquid flow passageway communicating with and leading from the liquid supply means; flow control means positioned in and making up a part of the liquid flow passageway, the said flow control means reproducibly regulating and continuously permitting to pass small controlled amounts of the liquid drug, and comprising
   a. a tube of a deformable elastic material defining an internal fluid flow passageway;
   b. a plurality of parallel linear elongate elastic fibers lodged in axial alignment within the internal fluid flow passageway and filling from 50 to about 95 percent of the cross-section of the passageway; and
   c. compressing means disposed about the tube at the location adjacent to the plurality of fibers deforming, to variable degrees, the tube;
and means for administering the small controlled amounts of liquid drug from the flow control means to the patient.

8. The device of claim 7 wherein the compressing means comprises a clamp and means for limiting the lateral spread of the tube during compression.

9. The device of claim 7 wherein the liquid drug is a drug for intravenous infusion, the small flow is a flow of from about 0.1 to about 10 cc/hour and the means for administering drug to the patient comprises means for intravessel infusion.

* * * * *